W. M. JACKSON.

SLITTING ATTACHMENT FOR CIGARS.

APPLICATION FILED SEPT. 26, 1921.

Reissued July 25, 1922. 15,422.

WITNESSES

E. A. Wilson

Robert J. Hulsiger.

INVENTOR

WALTER M. JACKSON

BY Munn & Co.

ATTORNEYS

UNITED STATES PATENT OFFICE.

WALTER M. JACKSON, OF NEW YORK, N. Y.

SLITTING ATTACHMENT FOR CIGARS.

15,422. Specification of Reissued Letters Patent. Reissued July 25, 1922.

Original No. 1,345,677, dated July 6, 1920, Serial No. 307,516, filed June 30, 1919. Application for reissue filed September 26, 1921. Serial No. 503,458.

*To all whom it may concern:*

Be it known that I, WALTER M. JACKSON, a citizen of the United States, and a resident of the city of New York, borough of Manhattan, in the county and State of New York, have invented a new and Improved Slitting Attachment for Cigars, of which the following is a full, clear, and exact description.

This invention relates to attachments adapted to be applied to the ends of cigars for the purpose of puncturing and slitting the end of the cigar.

An object of the invention is to provide a slitting attachment for slitting and puncturing the end of a cigar which is simple in structure, economical to manufacture and efficient in operation.

Another object of the invention is to provide a slitting attachment of the nature referred to adapted to be applied to the end of a cigar and to be removed from the cigar when the latter is to be used by a smoker, and wherein the act of removal of the attachment punctures or slits the cigar end or the cigar wrapper.

A further object of the invention is to provide, as a new article of manufacture, a cigar to which, when packed and sold to the consumer, is applied a slitting device on the end thereof which as it is being pulled off the cigar will cause a slitting of the surface of the wrapper adjacent the end of the cigar.

Other objects of the invention will appear more fully hereinafter.

The invention consists substantially in the construction, combination, location and arrangement of parts, all as will be more fully hereinafter set forth, as shown in the accompanying drawing and finally pointed out in the appended claims.

Referring to the accompanying drawing—

The same part is designated by the same reference numeral wherever it occurs throughout the several views.

In the use of cigars it is a common practice to cut off or remove that end of the cigar which is held in the mouth in order to rupture the wrapper ordinarily applied as the exterior covering of the cigar to enable the cigar to properly draw when lighted at the other end thereof. Sometimes the end of the cigar is detached or removed by the smoker biting off the end, and it is a common practice in cigar stores to employ cigar cutters for this purpose. In addition, it is also a common practice for individual smokers to carry cigar cutters for such use. The use of public cigar cutters is objectionable for various reasons. In the first place the smoker will frequently put the end of the cigar in his mouth before using the public cigar cutter and hence the danger is incurred of transmitting to subsequent users of the cutter infection or disease. Moreover, the purchaser of cigars does not always desire to cut off all of the cigars of his purchase, preferring ordinarily to leave the wrapper of the cigar intact until he desires to smoke, and when he uses the cigar a public cigar cutter may not be available. In the case of individually owned cigar cutters the smoker may not have such a cutter with him at the time he desires to smoke.

It is among the special purposes of my present invention to avoid these and other objections and to provide a simple attachment adapted to be applied to cigars and sold to the purchasers along with the cigars, and which in the act of removal thereof from the cigar effects the desired slitting of the cigar end without necessitating the use of public or other cutters, each cigar being equipped with its own slitting attachment.

Figure 1:
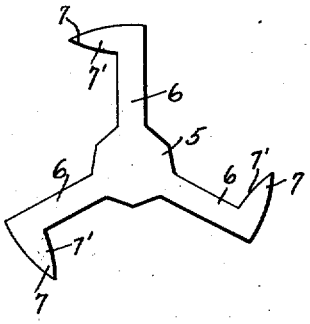
Figure 1 is a view in plan of a slitting attachment embodying the invention in its blanked out form before bending the arms and cutting points into position for application to a cigar end.
Figure 2:
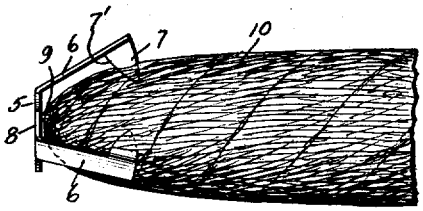
Figure 2 is a side view of the end of the cigar showing the attachment applied thereto.
Figure 3:
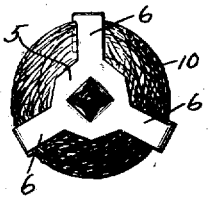
Figure 3 is an end view of the cigar with the attachment in place.
Figure 4:
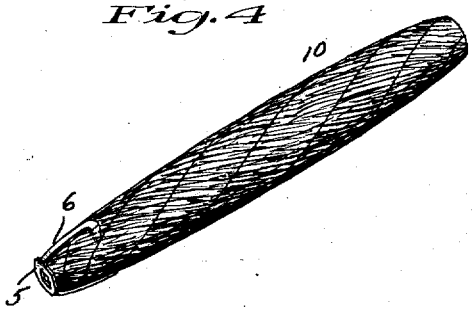
Figure 4 is a view in perspective showing the application of the attachment to the end of a cigar.

In carrying out my invention I stamp the attachment out of any suitable thin sheet of metal, such, for example, as aluminum, tin, steel, or the like. In its stamped out form as shown in Fig. 1 the device includes a central body portion 5 with a plurality of radiating arms 6, each arm having at its extremity a pointed knife edge cutter 7. The blank thus stamped out is completed by punching a central opening 8 through the body 5 of the device, leaving projections 9 extending from the inner face of the body portion. It is, however, quite possible to provide this slitting attachment without stamping out the body portion to provide the projections 9, since the slitting of the cigar wrapper in the act of withdrawing the attachment from the cigar is effected by the rearwardly disposed slitting edges 7′ as the attachment is pulled off the cigar. The knife edge points 7 are bent into preferably right angular relation with respect to the planes of their respective arms 6 and the arms are bent into position to engage over the end of a cigar indicated at 10 when the attachment is applied thereto with the cutting prongs or projections 7 presented toward the body of the cigar.

In use the device is slipped over the end of the cigar with the body projections 9 penetrating the extreme end of the cigar and with the cigar end embraced by the arms 6 of the device and with the cutting prongs 7 penetrating into the body of the cigar. With the projections 7 penetrating into the body of the cigar it is apparent that the slitting edges 7′ will effectively slit the cigar as the attachment is withdrawn therefrom. When it is desired to light and smoke the cigar the slitting attachment is simply drawn off the end of the cigar, leaving the extreme end thereof punctured by the projections 9, and leaving lines of slits through the cigar wrapper caused by dragging the cutting projections or extensions 7 longitudinally through the cigar wrapper after the attachment is drawn off. When the attachment is thus drawn off from the end of the cigar it may be either thrown away or preserved for application to another cigar. When the device is withdrawn from the cigar end the puncturing and slitting of the end of the cigar enables the cigar to effectively draw without necessitating any other cutting or removal or biting off of the cigar end to secure that result.

Having now set forth the objects and nature of my invention, and a construction embodying the principles thereof, what I claim as new and useful, and of my own invention and desire to secure by Letters Patent is,—

1. An attachment for cigars, comprising a body portion to be applied against the end of the cigar and having projections to penetrate into the end of the cigar, and arms embracing the cigar end, said arms having cutting points and slitting edges adapted to penetrate into the body of the cigar and slit the same as the attachment is withdrawn from the cigar.

2. A sheet metal puncturing and slitting attachment for cigars consisting of a body portion having projections formed therein and extending from one face thereof, said body portion adapted to be applied against the end surface of the cigar and the projections thereon to penetrate into such end surface, said body portion also having arms to engage over and embrace the cigar end, each of said arms formed with a cutting point or projection at the extremity thereof, said cutting points or extremities bent into substantially right angular relation to the planes of the arms and adapted to penetrate the body of the cigar whereby the withdrawal of the attachment from the cigar leaves the end surface of the cigar punctured and the exterior surface of the cigar end slitted longitudinally.

WALTER M. JACKSON.